United States Patent
Kiguchi et al.

(10) Patent No.: US 10,590,232 B2
(45) Date of Patent: Mar. 17, 2020

(54) RESIN COMPOSITION AND METHOD OF PRODUCING LAMINATE

(71) Applicant: HITACHI CHEMICAL COMPANY, LTD., Tokyo (JP)

(72) Inventors: Kazuya Kiguchi, Tokyo (JP); Tomoo Nishiyama, Tokyo (JP); Yoshitaka Takezawa, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 16/305,443

(22) PCT Filed: May 23, 2017

(86) PCT No.: PCT/JP2017/019240
§ 371 (c)(1),
(2) Date: Nov. 29, 2018

(87) PCT Pub. No.: WO2017/208907
PCT Pub. Date: Dec. 7, 2017

(65) Prior Publication Data
US 2019/0338069 A1    Nov. 7, 2019

(30) Foreign Application Priority Data
Jun. 2, 2016 (JP) .................. 2016-111372

(51) Int. Cl.
C08G 59/24 (2006.01)
B32B 7/12 (2006.01)
B32B 15/20 (2006.01)
C08J 5/18 (2006.01)
B32B 15/09 (2006.01)

(52) U.S. Cl.
CPC .............. *C08G 59/245* (2013.01); *B32B 7/12* (2013.01); *B32B 15/09* (2013.01); *B32B 15/20* (2013.01); *C08J 5/18* (2013.01); *C08J 2363/04* (2013.01)

(58) Field of Classification Search
CPC ..................................... C08G 59/245
See application file for complete search history.

(56) References Cited

FOREIGN PATENT DOCUMENTS

| JP | H11-222582 A | 8/1999 |
|---|---|---|
| JP | 2010-005836 A | 1/2010 |
| JP | 2011-526960 A | 10/2011 |
| JP | 2013-018991 A | 1/2013 |
| JP | 2013-179272 A | 9/2013 |
| JP | 2013-227451 A | 11/2013 |
| JP | 2013-249434 A | 12/2013 |

(Continued)

OTHER PUBLICATIONS

Notification of Reasons for Refusal dated Jan. 30, 2018, issued in Japanese Patent Application No. 2017-557019, together with English language translation thereof.

(Continued)

*Primary Examiner* — Daniel H Lee
(74) *Attorney, Agent, or Firm* — Fitch, Even, Tabin & Flannery, L.L.P.

(57) ABSTRACT

Provided is a resin composition for forming a resin layer of a laminate by coating, the resin composition having a thixotropic index at 25° C. of from 3 to 10, and the laminate includes a pair of members and the resin layer arranged between the pair of members.

10 Claims, 3 Drawing Sheets

(56) References Cited

FOREIGN PATENT DOCUMENTS

| | | |
|---|---|---|
| JP | 5431595 B2 | 3/2014 |
| JP | 2014-139021 A | 7/2014 |
| JP | 5806760 B1 | 11/2015 |
| JP | 2016-88978 A | 5/2016 |
| JP | 2017-502521 A | 1/2017 |
| KR | 2011-0025836 A | 3/2011 |
| KR | 2012-0060875 A | 6/2012 |
| WO | WO-2012108320 A1 * | 8/2012 ........... H01L 23/295 |
| WO | 2016/002865 A1 | 1/2016 |

OTHER PUBLICATIONS

Decision to Grant a Patent dated Jun. 19, 2018, issued in Japanese Patent Application No. 2017-557019, together with English language translation thereof.

* cited by examiner

RESIN COMPOSITION AND METHOD OF PRODUCING LAMINATE

CROSS-REFERENCE TO RELATED APPLICATIONS

This application is a U.S. national phase application filed under 35 U.S.C. § 371of International Application No. PCT/JP2017/019240, filed May 23, 2017, which claims priority from Japanese patent application 2016-111372, filed Jun. 02, 2016, the entire contents of each of which are hereby incorporated herein by reference.

TECHNICAL FIELD

The present invention relates to a resin composition and a method of producing a laminate.

BACKGROUND ART

As components of electronics and electrical appliances, laminates in which a resin layer for insulation and the like is arranged between a pair of members have been used in a variety of applications (see, for example, Patent Document 1). Such laminates are conventionally produced by pasting the members together via a film-shaped resin composition.

RELATED ART DOCUMENT

Patent Document

[Patent Document 1] Japanese Patent No. 5431595

SUMMARY OF INVENTION

Technical Problem

In recent years, for the production of the above-described laminates, methods of using a liquid resin composition in place of the film-shaped resin composition have been investigated. In these methods, a laminate is produced by first coating one of the members with a liquid resin composition, followed by disposing the other member on the resin composition.

Examples of properties that are desired for a resin composition used in these methods include that the resin composition is capable of uniformly forming a resin layer having excellent adhesion with the members (coating property), and that the resin composition is unlikely to spread beyond a coated region after being applied on the member (shape retainability). The coating property of a resin composition is generally improved as viscosity is reduced, while shape retainability is generally improved as viscosity is increased; therefore, there is room for investigating the design of a resin composition that satisfies both of these properties.

Further, in the above-described laminates, there are cases in which a resin layer formed from the resin composition is required to be thermally conductive. For the purpose of imparting the resin layer with favorable thermal conductivity, for example, methods of incorporating a large amount of a filler into the resin composition have been investigated. However, an increase in the filler amount leads to an increase in viscosity, deteriorating the coating property in some cases.

In view of the above-described circumstances, an object of the invention is to provide: a resin composition that has a coating property and shape retainability that are suitable for forming a resin layer of a laminate, and that is capable of forming a resin layer having favorable thermal conductivity; and a method of producing a laminate using the resin composition.

Solution to Problem

Specific means for achieving the above-described object include the following embodiments.

<1> A resin composition for forming a resin layer of a laminate by coating, the resin composition having a thixotropic index at 25° C. of from 3 to 10, and the laminate including a pair of members and the resin layer arranged between the pair of members.

<2> The resin composition according to <1>, having a viscosity of from 0.6 Pa·s to 3.5 Pa·s at 25° C. and 5 min$^{-1}$ (rpm).

<3> The resin composition according to <1> or <2>, including an epoxy resin.

<4> The resin composition according to any one of <1> to <3>, including: an epoxy monomer having a mesogenic skeleton; and a curing agent.

<5> The resin composition according to <4>, wherein the epoxy monomer having a mesogenic skeleton includes a compound represented by the following Formula (I):

$$\text{(I)}$$

wherein, in Formula (I), each of $R^1$ to $R^4$ independently represents a hydrogen atom or an alkyl group having 1 to 3 carbon atoms.

<6> The resin composition according to <4> or <5>, wherein the curing agent includes a phenol novolac resin.

<7> A method of producing a laminate, the method including:

a resin layer forming step of forming a resin layer using the resin composition according to any one of <1> to <6> on a first member; and a member arranging step of arranging a second member on the resin layer.

Effects of Invention

According to the invention, a resin composition that has a coating property and shape retainability that are suitable for forming a resin layer of a laminate, and that is capable of forming a resin layer having favorable thermal conductivity, and a method of producing a laminate using the resin composition, are provided.

DESCRIPTION OF EMBODIMENTS

Figure 1:
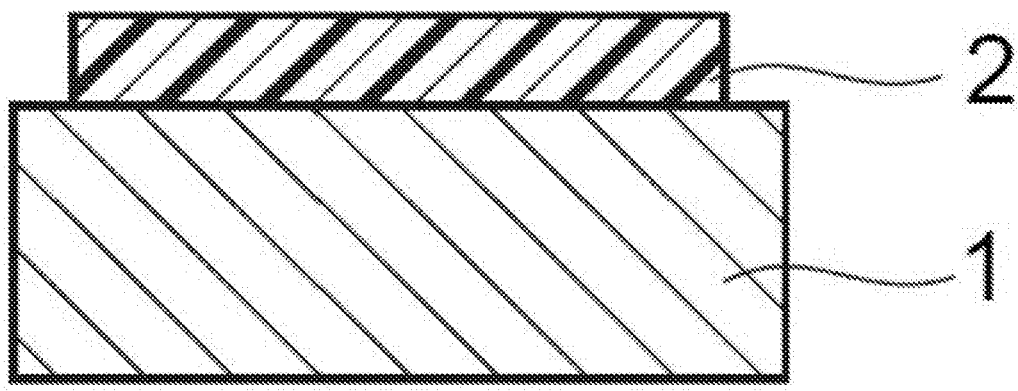
FIG. 1 illustrates one example of a step of producing a laminate using the resin composition according to an embodiment of the present invention.

Embodiments of the invention are described below in detail. It is noted here, however, that the invention is not restricted to the embodiments. In the embodiments described below, the constituents thereof (including element steps and the like) are not indispensable unless otherwise specified. The same applies to the numerical values and ranges thereof, without restricting the invention.

In the present specification, the term "step" encompasses not only steps discrete from other steps but also steps which cannot be clearly distinguished from other steps, as long as the intended purpose of the step is achieved.

In the present specification, those numerical ranges that are expressed with "to" each denote a range that includes the numerical values stated before and after "to" as the minimum value and the maximum value, respectively.

In a set of numerical ranges that are stated stepwise in the present specification, the upper limit value or the lower limit value of a numerical range may be replaced with the upper limit value or the lower limit value of other numerical range. Further, in a numerical range stated in the present specification, the upper limit or the lower limit of the numerical range may be replaced with a relevant value indicated in any of Examples.

In the present specification, when there are plural kinds of substances that correspond to a component of a composition, the indicated content ratio of the component in the composition means, unless otherwise specified, the total content ratio of the plural kinds of substances existing in the composition.

In the present specification, when there are plural kinds of particles that correspond to a component of a composition, the indicated particle size of the component in the composition means, unless otherwise specified, a value determined for a mixture of the plural kinds of particles existing in the composition.

In the present specification, the term "layer" or "film" encompasses, when a region having the layer or the film is observed, not only a case in which the layer or the film is formed on the entirety of the region but also a case in which the layer or the film is formed only a part of the region.

In the present specification, the term "laminate" indicates that layers are disposed on top of each other, and two or more layers may be bonded with each other or may be detachable from one another.

The number of structural units represents an integer value for a single molecule, or a rational number, which is an average value, for an aggregate of plural kinds of molecules.

A resin sheet obtained by drying a resin composition layer formed from a resin composition and subjecting the thus dried resin composition layer to a hot press treatment may be hereinafter referred to as "B-stage sheet".

With regard to B stage, reference should be made to the provisions of JIS K6900: 1994.

In the present specification, with regard to the definition of "surface roughness (Rz)", reference should be made to the provisions of JIS B0601: 2001 (Rzjis).

<Resin Composition>

The resin composition according to an embodiment has a thixotropic index at 25° C. of from 3 to 10 and is used for forming a resin layer of a laminate by coating, the laminate including a pair of members and the resin layer arranged between the pair of members.

Since the resin composition has a thixotropic index at 25° C. of from 3 to 10, the resin composition has excellent coating property with respect to the members that are the constituents of the laminate and exhibits excellent shape retainability after the coating. Therefore, a resin layer having excellent adhesion with respect to the members can be formed at a prescribed position. Accordingly, for example, even in a case in which the members constituting the laminate have been singulated in advance, a resin layer having excellent adhesive strength can be formed at a prescribed position.

That the members constituting a laminate have been "singulated" means that the members prior to the formation of a resin layer have the same size and shape as the size and shape of the members in the laminate that is eventually obtained.

The term "thixotropic index at 25° C." used herein refers to a ratio (viscosity B/viscosity A) of a viscosity B (Pa·s) measured under the conditions of 25° C. and 0.5 $min^{-1}$ (rpm) with respect to a viscosity A (Pa·s) measured under the conditions of 25° C. and 5 $min^{-1}$ (rpm). The thixotropic index at 25° C. is preferably from 3 to 10, and more preferably from 5 to 7.

From the viewpoint of coating property, the viscosity of the resin composition at 25° C. and 5 $min^{-1}$ (rpm) is preferably from 0.6 Pa·s to 3.5 Pa·s, more preferably from 0.8 Pa·s to 3 Pa·s, and still more preferably from 1 Pa·s to 2.5 Pa·s.

The viscosity and the thixotropic index of the resin composition may be adjusted by, for example, changing the type, amount or the like of a component(s) of the resin composition.

Examples of a resin contained in the resin composition include thermosetting resins such as epoxy resins, phenol resins, urea resins, melamine resins, urethane resins, silicone resins, or unsaturated polyester resins. The resin composition may contain one resin, or may contain two or more resins. From the viewpoints of electrical insulation and adhesion, it is preferred that the resin composition contains an epoxy resin. The resin composition may also contain a component other than a resin, such as a filler, as required.

In the laminate formed using the resin composition, the material of the pair of members is not particularly restricted, and examples thereof include metals, semiconductors, glass, resins, and composites thereof. The shape of the pair of members is also not particularly restricted, and examples thereof include a plate shape, a foil shape, and a film shape. In the pair of members, the material and shape of the respective members may be the same as or different from each other.

The thickness of the resin layer formed from the resin composition is not particularly restricted. From the viewpoint of satisfactory obtaining the effects (e.g., insulation) exerted by the formation of the resin layer, the thicker the resin layer, the more preferred it is; however, from the viewpoint of production cost, the thinner the resin layer, the more preferred it is. For example, the thickness of the resin layer may be in a range of from 80 μm to 300 μm. In the present specification, the thickness of the resin layer may be measured by any known method and is a number-average of values measured at five spots.

The use application of the laminate having the resin layer formed from the resin composition is not particularly restricted. Examples thereof include semiconductor devices.

Among semiconductor devices, the laminate can be particularly suitably used in those parts having a high heat generation density.

<Method of Producing Laminate>

A method of producing a laminate using the resin composition according to an embodiment of the invention is not particularly restricted. In one embodiment, the resin composition is used in a method of producing a laminate, which method includes: a resin layer forming step of forming a resin layer on a first member; and a member arranging step of arranging a second member on the resin layer.

In the resin layer forming step, a resin layer is formed by coating the resin composition on the first member. A method of coating the resin composition is not particularly restricted and, for example, a dispensing method, a printing method, a transfer method, a spray method, or an electrostatic coating method may be applied in accordance with the intended use. From the viewpoint of adhesion of the resin layer with respect to the first member, it is preferred to employ a method of coating the resin composition, which is in a state of a composition (varnish) containing a resin and a solvent, onto the first member and subsequently removing the solvent by drying.

From the viewpoint of workability in the step after the formation of the resin layer on the first member, it is preferred that the resin layer forming step includes a step of heating the resin layer. By heating the resin layer, volatile components contained in the resin layer, such as a solvent, are efficiently removed. The heating induces the reaction of the resin component(s) in the resin layer, and this leads to an increase in viscosity and a reduction in conformability to the second member to a certain extent; however, it is capable of ensuring favorable adhesion by bringing the second member having a low surface roughness into contact with the resin layer.

A method of heating the resin layer is not particularly restricted, and a method which is capable of bringing the resin layer into a B-stage state is preferred. A method and conditions of bringing the resin layer into a B-stage state are not particularly restricted. From the viewpoint of forming a resin layer whose surface is smooth and has reduced thickness variation, a method of interposing the first member and the resin layer formed thereon between a pair of hot plates and heating them while applying a pressure thereto is preferable.

In the member arranging step, the second member is arranged on the resin layer formed on the first member. A method of arranging the second member is not particularly restricted.

After the second member has been arranged on the resin layer formed on the first member, the resin layer is cured, thereby obtaining a laminate. A method of curing the resin layer is not particularly restricted. For example, the resin layer may be cured by interposing the resin layer with the second member being arranged on the resin layer between a pair of hot plates, and heating the resultant while applying a pressure thereto.

An example of the steps of producing a laminate using the resin composition according to an embodiment will now be described by referring to the drawings. It is noted here, however, that the sizes of the members in the drawings are conceptual, and the relative size relationships between the members are not restricted to those illustrated in the drawings.

Figure 2:
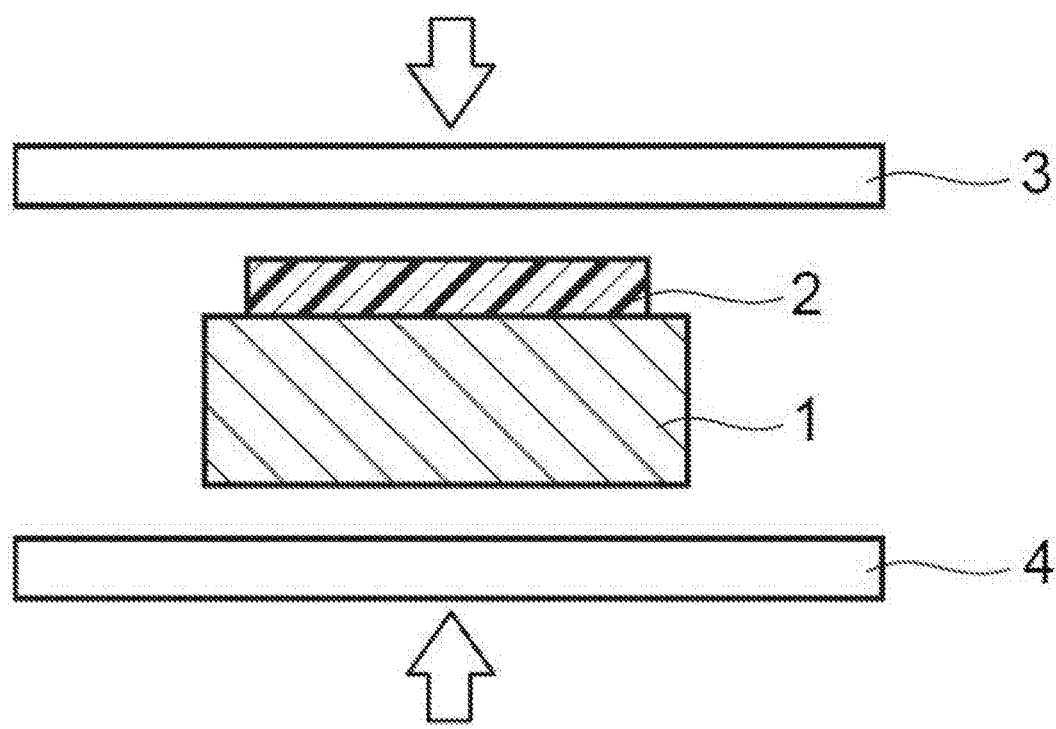
FIG. 2 illustrates one example of another step of producing a laminate using the resin composition according to an embodiment of the present invention.
Figure 3:
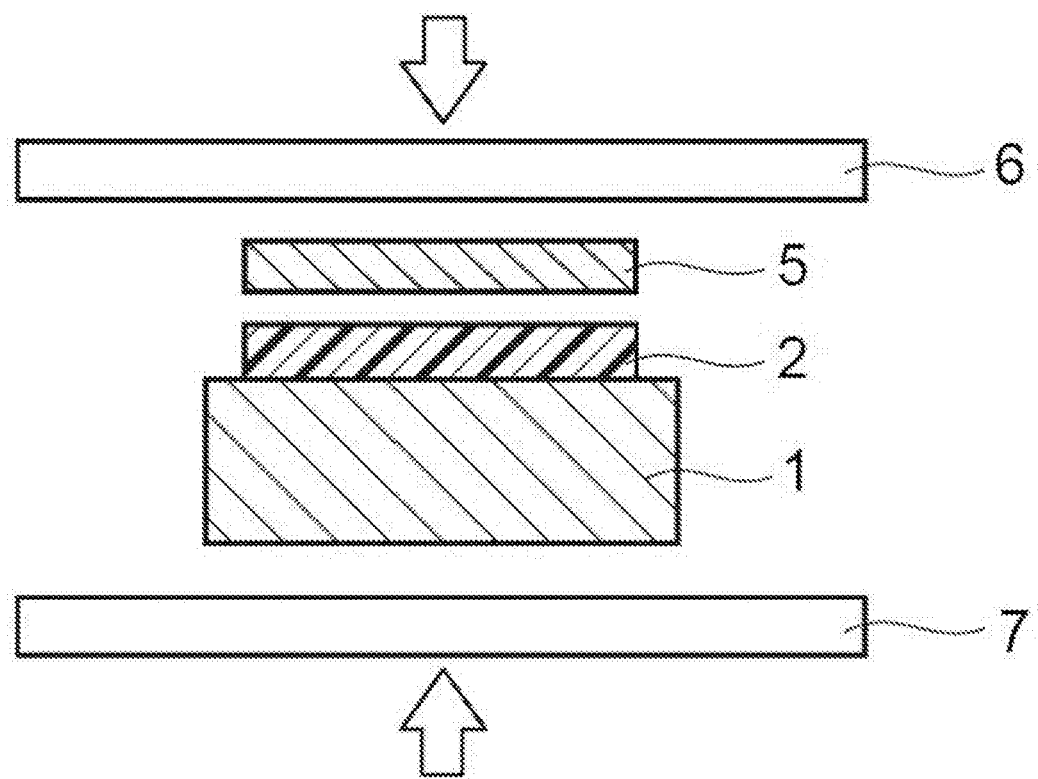
FIG. 3 illustrates one example of yet another step of producing a laminate using the resin composition according to an embodiment of the present invention.

First, as illustrated in FIG. 1, a resin composition is coated on first member 1 to form resin layer 2. Next, as illustrated in FIG. 2, first member 1 on which resin layer 2 has been formed is interposed between a pair of hot plates 3 and 4, and resin layer 2 is heated under pressure, thereby bringing it into a B-stage state. Then, as illustrated in FIG. 3, second member 5 is arranged on resin layer 2 and, in this state, the resultant is interposed between a pair of hot plates 6 and 7 and heated under pressure to cure resin layer 2, thereby obtaining a laminate.

The laminate produced using the resin composition according to an embodiment may be used as is, or may be used in a state of being cut and thereby singulated into a desired shape. Examples of a method of obtaining a singulated laminate include: (1) a method of singulating in advance the first member on which the resin layer has not been formed yet and the second member prior to being arranged on the resin layer; (2) a method of forming the resin layer on the first member, singulating the resulting laminate of the first member and the resin layer, and then arranging a singulated second member on the resin layer; and (3) a method of arranging the second member on the resin layer and then singulating a laminate obtained by curing the resin layer.

From the viewpoint of preventing deterioration of the resin layer performance (e.g., insulation) caused by breakage of the resin layer, contamination of the resin layer with a foreign matter or the like in the singulating step, the method (1) of singulating in advance the first member on which the resin layer has not been formed yet and the second member prior to being arranged on the resin layer, which method does not involve cutting of the resin layer, is preferred.

In the case of employing the method (1) of singulating in advance the first member on which the resin layer has not been formed yet and the second member prior to being arranged on the resin layer, it is preferred to form the resin layer in conformity with the shape of the first member in a singulated state. Since the resin composition according to an embodiment has a thixotropic index at 25° C. of from 3 to 10, it is capable of forming a resin layer at a prescribed position even in such a case.

In one embodiment, the resin composition is suitably used in a method of producing a laminate, which method includes: a resin layer forming step of forming a resin layer on a first member; and a member arranging step of arranging a second member on the resin layer, and which satisfies at least one of the following conditions (1) and (2).

(1) The surface roughness (Rz) of the surface of the first member that comes into contact with the resin layer is larger than the surface roughness (Rz) of the surface of the second member that comes into contact with the resin layer; and (2) The surface of the second member that comes into contact with the resin layer has a surface roughness (Rz) of 30 μm or less.

In a case in which the production method satisfies the condition (1), even if the conformability of the resin layer formed on the first member with respect to the surface shape of the second member is deteriorated, the resin layer prior to the deterioration of the conformability is formed on the first member having a higher surface roughness, and the second member having a lower surface roughness is arranged on the resin layer after the deterioration of the conformability. By setting the order of bringing the first member and the second member into contact with the resin layer as in the above-described production method, a laminate in which the resin layer has excellent adhesion with the respective members can be obtained.

In a case in which the method of producing a laminate satisfies the condition (2), even if the conformability of the resin layer formed on the first member with respect to the surface shape of the second member is deteriorated, since the surface of the second member that comes into contact with the resin layer has a surface roughness (Rz) of 30 μm or less, sufficient adhesion is attained.

In the of producing a laminate, the surface roughness (Rz) of the first member and the surface roughness (Rz) of the second member are not particularly restricted as long as at least one of the conditions (1) and (2) is satisfied, and the surface roughness (Rz) of each member may be selected in accordance with the type of the resin contained in the resin layer, the degree of adhesion required for the resulting laminate, or the like. When each member has two or more portions having different surface roughnesses due to the presence of a portion(s) composed of two or more materials on the surface coming into contact with the resin layer, or due to the presence of electrodes at two or more positions even if the member is composed of a single material, the surface roughness of a portion having the highest surface roughness is defined as the surface roughness of the member.

The surface roughness (Rz) of the first member may be, for example, 5 μm or larger, 10 μm or larger, or 20 μm or larger. The surface roughness (Rz) of the first member may be, for example, 80 μm or less.

The surface roughness (Rz) of the second member may be, for example, 20 μm or less, 10 μm or less, or 5 μm or less. The surface roughness (Rz) of the second member may be, for example, 3 μm or larger.

The first member and the second member may each be subjected to a surface roughening treatment. In general, there is a tendency that the higher the surface roughness of the surface of a member that comes into contact with the resin layer, the more prominent is the anchor effect exerted by the entry of the resin layer into the surface irregularities of the member and the higher is the adhesive strength. As a result, for example, the shear strength which is an index for the adhesive force applied to the resin layer mainly in the planar direction and the peel strength which is an index for the adhesive force applied to the resin layer mainly in the vertical direction are expected to be improved. It is preferred that void generation is limited when joining the members and the resin layer, and it is more preferred that the members and the resin layer are tightly adhered without void generation. The insulation tends to be improved by limiting void generation when joining the members and the resin layer.

Surface-roughened members may be obtained by using a material naturally having a rough surface, or by roughening a material having a smooth surface. A method of performing the surface roughening treatment is not particularly restricted, and the surface roughening treatment may be performed by a physical method or a chemical method. Examples of the physical method include sanding, sandblasting, and laser irradiation. Examples of a chemical treatment include: when the material is copper, a Magdamit treatment, a CZ treatment, a blackening treatment, and an etching treatment; and, when the material is aluminum, an alumite treatment. The surface treatment method is not restricted thereto, and a physical treatment or a chemical treatment may be performed singly, or a combination of a physical treatment and a chemical treatment may be performed. Furthermore, a combination of two or more chemical treatments may be performed, or a combination of two or more physical treatments may be performed.

A surface treatment agent may be applied to the surfaces of the first and second members that come into contact with the resin layer. Examples of the surface treatment agent include surface protective agents, such as monomer coatings of solid or liquid thermosetting resins and solvent coatings of thermoplastic resins, which are intended for improving the resin wettability, as well as silanol coupling agents, titanate coupling agents, aluminosilicate agents, and leveling agents.

<Epoxy Resin Composition>

The resin composition according to an embodiment may be an epoxy resin composition which contains an epoxy monomer and a curing agent.

[Epoxy Monomer]

The epoxy resin composition may contain a single kind of epoxy monomer, or two or more kinds of epoxy monomers. Further, the epoxy monomer(s) contained in the epoxy resin composition may be in the state of an oligomer or a prepolymer.

The type(s) of the epoxy monomer(s) is/are not particularly restricted and may be selected in accordance with the intended use or the like of the resulting laminate. In cases in which the resin layer is demanded to have a high thermal conductivity, an epoxy monomer which has a mesogenic skeleton and two glycidyl groups in one molecule (hereinafter, also referred to as "specific epoxy monomer") may be used. A resin layer formed from an epoxy resin composition containing the specific epoxy monomer tends to exhibit a high thermal conductivity.

The term "mesogenic skeleton" used herein refers to a molecular structure capable of expressing liquid crystallinity. Specific examples of the mesogenic skeleton include a biphenyl skeleton, a phenyl benzoate skeleton, an azobenzene skeleton, a stilbene skeleton, and derivatives thereof. An epoxy resin composition containing an epoxy monomer having a mesogenic skeleton is likely to form a higher-order structure when cured, and a cured product prepared therefrom tends to attain a higher thermal conductivity.

Examples of the specific epoxy monomer include biphenyl-type epoxy monomers and tricyclic epoxy monomers.

Examples of the biphenyl-type epoxy monomers include 4,4'-bis(2,3-epoxypropoxy)biphenyl, 4,4'-bis(2,3-epoxypropoxy)-3,3',5,5'-tetramethylbiphenyl, epoxy monomers obtained by a reaction between epichlorohydrin and 4,4'-biphenol or 4,4'-(3,3',5,5'-tetramethyl)biphenol, and α-hydroxyphenyl-ω-hydropoly(biphenyldimethylene-hydroxyphenylene). Examples of biphenyl-type epoxy resins include those that are commercially available under the trade names "YX4000" and "YL6121H" (both of which are available from Mitsubishi Chemical Corporation) as well as "NC-3000" and "NC-3100" (both of which are available from Nippon Kayaku Co., Ltd.).

Examples of the tricyclic epoxy monomers include epoxy monomers having a terphenyl skeleton, 1-(3-methyl-4-oxiranylmethoxyphenyl)-4-(4-oxiranylmethoxyphenyl)-1-cyclohexene, 1-(3-methyl-4-oxiranylmethoxyphenyl)-4-(4-oxiranylmethoxyphenyl)-benzene, and compounds represented by the Formula (I) described below.

From the viewpoint of achieving a higher thermal conductivity, the specific epoxy monomer is, when used singly as an epoxy monomer and cured, capable of forming preferably a higher-order structure, and more preferably a smectic structure. Examples of such an epoxy monomer include the compounds represented by the following Formula (I). By containing a compound represented by the following Formula (I), the epoxy resin composition is capable of achieving a higher thermal conductivity.

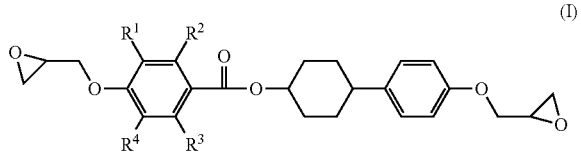

(I)

In Formula (I), each of $R^1$ to $R^4$ independently represents a hydrogen atom or an alkyl group having 1 to 3 carbon atoms. Each of $R^1$ to $R^4$ independently represents preferably a hydrogen atom or an alkyl group having 1 or 2 carbon atoms, more preferably a hydrogen atom or a methyl group, and still more preferably a hydrogen atom. Furthermore, it is preferable that from two to four of $R^1$ to $R^4$ are hydrogen atoms, it is more preferable that three or four of $R^1$ to $R^4$ are hydrogen atoms, and it is still more preferable that all four of $R^1$ to $R^4$ are hydrogen atoms. When any one of $R^1$ to $R^4$ represents an alkyl group having 1 to 3 carbon atoms, it is preferable that at least one of $R^1$ and $R^4$ represents an alkyl group having 1 to 3 carbon atoms.

Preferred examples of the compound represented by Formula (I) are described in, for example, Japanese Patent Application Laid-Open (JP-A) No. 2011-74366. Specifically, the compound represented by Formula (I) is preferably at least one selected from the group consisting of 4-{4-(2,3-epoxypropoxy)phenyl}cyclohexyl=4-(2,3-epoxypropoxy)benzoate and 4-{4-(2,3-epoxypropoxy)phenyl}cyclohexyl=4-(2,3-epoxypropoxy)-3-methylbenzoate.

The term "higher-order structure" used herein means a state in which constituents of the structure are microscopically arrayed and, for example, a crystal phase and a liquid-crystal phase correspond to the term. The presence or absence of such a higher-order structure can be easily determined by observation under a polarizing microscope. That is, it can be judged that a higher-order structure is present when interference fringes formed by depolarization are observed in a crossed Nicol state. A higher-order structure usually exists in a resin in the form of islands forming a domain structure, and each of the islands forming the domain structure is referred to as "higher-order structural component". Structural units constituting a higher-order structural component are generally bound with each other by covalent bonds.

Examples of a highly regular higher-order structure derived from a mesogenic skeleton include nematic structures and smectic structures. Nematic structures are liquid-crystal structures in which molecular long axes are oriented in a uniform direction and which have only an orientational order. On the other hand, smectic structures are liquid-crystal structures which have a one-dimensional positional order in addition to an orientational order and have a constant-period layered structure. Further, inside a structure of the same period in a smectic structure, the periodic direction of the layered structure is uniform. That is, the molecular regularity is higher in smectic structures than in nematic structures. When a highly regular higher-order structure is formed in a semi-cured or cured product, scattering of phonons that are heat conduction media can be suppressed. Therefore, smectic structures have a higher thermal conductivity than nematic structures.

In other words, smectic structures have a higher molecular regularity than nematic structures, and the thermal conductivity of a cured product is higher when the cured product has a smectic structure. The epoxy resin composition containing a compound represented by Formula (I) is believed to be capable of exerting a high thermal conductivity since it is capable of forming a smectic structure by reacting with a curing agent.

Whether or not a smectic structure can be formed using the epoxy resin composition can be judged by the following method.

X-ray diffractometry is performed using an X-ray analyzer (e.g., available from Rigaku Corporation) with $CuK_\alpha 1$ radiation at a tube voltage of 40 kV and a tube current of 20 mA in a 2θ range of from 0.5° to 30°. It is judged that a periodic structure includes a smectic structure when a diffraction peak exists in a 2θ range of from 1° to 10°. When the epoxy resin composition has a highly regular higher-order structure derived from a mesogenic structure, a diffraction peak appears in a 2θ range of from 1° to 30°.

The epoxy resin composition may also be an epoxy resin composition which contains two or more kinds of specific epoxy monomers and a curing agent, in which the two or more kinds of specific epoxy monomers are compatible with each other and capable of forming a smectic structure by reacting with the curing agent (this epoxy resin composition is hereinafter also referred to as "specific epoxy resin composition"). The specific epoxy resin composition has a low melting temperature and superior post-curing thermal conductivity.

The term "two or more kinds of epoxy monomers" used herein means two or more epoxy monomers having different molecular structures. It is noted here, however, that epoxy monomers in a stereoisomeric relationship (e.g., optical isomers or geometric isomers) do not correspond to "two or more kinds of epoxy monomers" and are regarded as epoxy monomers of the same kind.

The reason why the specific epoxy resin composition has a low melting temperature and superior post-curing thermal conductivity is not clear; however, it is believed that the two or more kinds of specific epoxy monomers mix with each other to form a smectic structure, thereby lowering the melting temperature of the specific epoxy resin composition before curing and allowing the specific epoxy resin composition to exhibit a high thermal conductivity after curing.

The specific epoxy resin composition contains two or more kinds of specific epoxy monomers that are compatible with each other. A mixture obtained by mixing the two or more kinds of specific epoxy monomers that are compatible with each other (this mixture is hereinafter also referred to as "epoxy monomer mixture") is observed with a phenomenon that its melting temperature is lower than the melting temperature of a specific epoxy monomer having the highest melting temperature among the specific epoxy monomers constituting the epoxy monomer mixture. Accordingly, the melting temperature of the specific epoxy resin composition can be lowered.

Furthermore, the thermal conductivity of a semi-cured or cured product of the specific epoxy resin composition can be higher than the thermal conductivities of semi-cured or cured products of individual specific epoxy monomers constituting the epoxy monomer mixture.

When the epoxy monomer mixture contains three or more kinds of specific epoxy monomers, all of the specific epoxy monomers constituting the epoxy monomer mixture may be compatible as a whole, and any two kinds of specific epoxy monomers selected from the three or more kinds of specific epoxy monomers are not necessarily compatible with each other.

The term "compatible" used herein means that, when the epoxy monomer mixture is melted and then naturally cooled and the specific epoxy resin composition is subsequently made into a semi-cured or cured product, a phase-separated state derived from the specific epoxy monomers is not observed. Further, even if the specific epoxy monomers undergo phase separation in the epoxy monomer mixture that has not been made into a semi-cured or cured product, it is judged that the specific epoxy monomers contained in the epoxy monomer mixture are compatible with each other as long as a phase-separated state is not observed when the epoxy monomer mixture is made into a semi-cured or cured product.

The phrase "specific epoxy monomers are compatible with each other" used herein means that the specific epoxy monomers constituting the epoxy monomer mixture is capable of existing in a non-phase-separated at the curing temperature of the specific epoxy resin composition.

Whether or not the specific epoxy monomers are compatible with each other may be judged based on the presence or absence of a phase-separated state when the specific epoxy resin composition is made into a semi-cured or cured product. For example, the judgment can be made by observing a semi-cured or cured product of the specific epoxy resin composition at the curing temperature described below under a light microscope. More specifically, the judgment can be made by the following method. The epoxy monomer mixture is heat-melted at not lower than a temperature at which transition of the epoxy monomer mixture into an isotropic phase occurs, and the thus melted epoxy monomer mixture is subsequently cooled naturally. In this process, at a temperature at which a semi-cured or cured product is formed using the specific epoxy resin composition, i.e., at the curing temperature, an optical micrograph (magnification: ×100) of the semi-cured or cured product of the specific epoxy resin composition is observed, and the judgment is made based on the observation of whether or not the specific epoxy monomers contained in the epoxy monomer mixture have undergone phase separation.

The curing temperature may be selected as appropriate in accordance with the specific epoxy resin composition. The curing temperature is preferably 100° C. or higher, more preferably from 100° C. to 250° C., and still more preferably from 120° C. to 210° C.

In addition to the above-described method, whether or not the specific epoxy monomers are compatible with each other can be examined by observing a semi-cured or cured product derived from the epoxy monomer mixture under a scanning electron microscope (SEM). After cutting out a cross-section of the semi-cured or cured product derived from the epoxy monomer mixture using, for example, a diamond cutter, the cross-section is polished with an abrasive paper or a slurry, and the state of the thus polished cross-section is observed under an SEM at a magnification of, for example, ×2,000. Phase separation can be observed in the case of a semi-cured or cured product derived from an epoxy monomer mixture composed of a combination of epoxy monomers that undergo phase separation.

An epoxy monomer mixture composed of a combination of compatible specific epoxy monomers is observed with a phenomenon that its melting temperature is lower than the melting temperature of a specific epoxy monomer having the highest melting temperature among the specific epoxy monomers constituting the epoxy monomer mixture. With regard to an epoxy monomer having a liquid crystal phase, the term "melting temperature" used herein refers to a temperature at which phase transition of the epoxy monomer from the liquid crystal phase to an isotropic phase occurs. With regard to an epoxy monomer not having a liquid crystal phase, the term "melting temperature" refers to a temperature at which the substance state changes from solid (crystal phase) to liquid (isotropic phase).

The term "liquid crystal phase" refers to a phase between a crystalline state (crystal state) and a liquid state (isotropic phase), which is a state in which three-dimensional positional order is lost although a certain level of order is maintained in terms of molecular orientation direction.

The presence or absence of a liquid crystal phase can be distinguished by a method of observing the change in the state of the substance of interest under a polarizing microscope in the course of heating the substance from room temperature (e.g., 25° C.). In observation in a crossed Nicol state, a crystal phase and a liquid crystal phase are observed with interference fringes formed by depolarization, and an isotropic phase appears as a dark field. In addition, a transition from a crystal phase to a liquid crystal phase can be verified by the presence or absence of fluidity. That is, expression of a liquid crystal phase means that the substance has fluidity and a temperature range in which interference fringes formed by depolarization are observed.

In other words, in observation in a crossed Nicol state, when the epoxy monomer mixture or the specific epoxy monomers is/are confirmed to have fluidity and a temperature range in which interference fringes formed by depolarization are observed, the epoxy monomer mixture or the specific epoxy monomers is/are judged to have a liquid crystal phase.

In cases in which the epoxy monomer mixture has a liquid crystal phase, the width of the temperature range thereof is preferably 10° C. or broader, more preferably 20° C. or broader, and still more preferably 40° C. or broader. When the temperature range is 10° C. or broader, a high thermal conductivity tends to be attained. The broader the temperature range, the more preferred it is, since a higher thermal conductivity is likely to be attained.

The melting temperature of the specific epoxy monomer(s) or the epoxy monomer mixture is measured, as a temperature at which a change in energy (endothermic reaction) associated with phase transition occurs, by performing differential scanning calorimetry (DSC) in a temperature range of from 25° C. to 350° C. at a heating rate of 10° C./min using a differential scanning calorimeter. From the viewpoints of workability and reactivity, it is not preferred for the specific epoxy monomers or the epoxy monomer mixture to have a melting point of 120° C. or higher.

In a case in which the specific epoxy monomers are compatible with each other, that is, in a case in which the specific epoxy monomers are not phase-separated from each other in a semi-cured or cured product derived from the epoxy monomer mixture, the specific epoxy monomers are not phase-separated from each other in a semi-cured or cured product of the specific epoxy resin composition, even when the specific epoxy resin composition is formed by adding a curing agent and, as required, an inorganic filler or the like to the specific epoxy monomers.

The two or more kinds of specific epoxy monomers contained in the specific epoxy resin composition are not particularly restricted as long as they are compatible with each other and are capable of forming a smectic structure by reacting with the curing agent described below, and the specific epoxy monomers may be selected from those epoxy monomers having mesogenic skeletons that are generally used. For example, the specific epoxy monomers may be selected from the above-exemplified epoxy monomers.

It is preferred that the specific epoxy resin composition contains, as the two or more kinds of specific epoxy monomers: a compound represented by Formula (I); and a specific epoxy monomer that is different from the compound represented by Formula (I) and compatible with the compound represented by Formula (I) (hereinafter, referred to as "specific epoxy monomer different from the compound represented by Formula (I)"). By containing the compound represented by Formula (I) and the specific epoxy monomer different from the compound represented by Formula (I), the epoxy resin composition is capable of effectively achieving both a reduction in the melting temperature and an improvement in the thermal conductivity.

From the viewpoint of achieving both a reduction in the melting temperature and an improvement in the thermal conductivity, the mixing ratio of the compound represented by Formula (I) and the specific epoxy monomer different from the compound represented by Formula (I) is, in terms of epoxy equivalent ratio, preferably in a range of from 5:5 to 9.5:0.5 (compound represented by Formula (I): specific epoxy monomer different from the compound represented by Formula (I)), more preferably in a range of from 6:4 to 9:1, and still more preferably in a range of from 7:3 to 9:1.

The content ratio of the specific epoxy monomer in the epoxy monomer mixture is not particularly restricted as long as the epoxy monomer mixture is capable of forming a smectic structure by reacting with the curing agent described below, and the content ratio may be selected as appropriate. From the viewpoint of reducing the melting temperature, the content ratio of the specific epoxy monomer is preferably 5% by mass or more, more preferably from 10% by mass to 90% by mass, and still more preferably 100% by mass, with respect to the total mass of the epoxy monomer mixture.

The total content ratio of the specific epoxy monomers in the epoxy resin composition is also not particularly restricted. From the viewpoints of heat curability and thermal conductivity, the total content ratio of the specific epoxy monomers is preferably from 3% by mass to 10% by mass, and more preferably from 3% by mass to 8% by mass, with respect to the total mass of the epoxy resin composition.

[Curing Agent]

The epoxy resin composition contains a curing agent. The curing agent is not particularly restricted as long as it is a compound capable of undergoing a curing reaction with the specific epoxy monomers, and any curing agent that is usually used may be selected as appropriate. Specific examples of the curing agent include: polyaddition-type curing agents such as acid anhydride-based curing agents, amine-based curing agents, phenol-based curing agents, or mercaptan-based curing agents; and catalyst-type curing agents such as imidazoles. These curing agents may be used singly, or in combination of two or more kinds thereof.

From the viewpoint of heat resistance, it is preferred to use, as a curing agent, at least one selected from the group consisting of amine-based curing agents and phenol-based curing agents. From the viewpoint of storage stability, it is more preferred to use, as a curing agent, at least one phenol-based curing agent.

As an amine-based curing agent, one which is usually used as a curing agent of an epoxy monomer may be used with no particular restriction, and any commercially available amine-based curing agent may be used as well. Particularly, the amine-based curing agent is preferably a polyfunctional curing agent having two or more functional groups from the viewpoint of curing properties, and more preferably a polyfunctional curing agent having a rigid skeleton from the viewpoint of thermal conductivity.

Specific examples of a bifunctional amine-based curing agent include 4,4'-diaminodiphenylmethane, 4,4'-diamino- diphenyl ether, 4,4'-diaminodiphenylsulfone, 4,4'-diamino-3,3'-dimethoxybiphenyl, 4,4'-diaminophenylbenzoate, 1,5-diaminonaphthalene, 1,3-diaminonaphthalene, 1,4-diaminonaphthalene, and 1,8-diaminonaphthalene.

From the viewpoint of thermal conductivity, at least one selected from the group consisting of 4,4'-diaminodiphenylmethane, 1,5-diaminonaphthalene and 4,4'-diaminodiphenylsulfone is preferred, and 1,5-diaminonaphthalene is more preferred.

As a phenol-based curing agent, one which is normally used as a curing agent of an epoxy monomer may be used with no particular restriction, and any commercially available phenol-based curing agent may be used as well. For example, phenols and phenol resins obtained by converting phenols into novolac may be used.

Examples of the phenol-based curing agent include: monofunctional compounds such as phenol, o-cresol, m-cresol, orp-cresol; bifunctional compounds such as catechol, resorcinol, or hydroquinone; and tri-functional compounds such as 1,2,3-trihydroxybenzene, 1,2,4-trihydroxybenzene, and 1,3,5-trihydroxybenzene. Furthermore, as the curing agent, phenol novolac resins obtained by converting these phenol-based curing agents into novolac via linking with a methylene chain or the like may be used as well.

Specific examples of the phenol novolac resins include: resins obtained by converting a single phenol compound into novolac, such as cresol novolac resins, catechol novolac resins, resorcinol novolac resins, or hydroquinone novolac resins; and resins obtained by converting two or more phenol compounds into novolac, such as catechol resorcinol novolac resins or resorcinol hydroquinone novolac resins.

When a phenol novolac resin is used as a phenol-based curing agent, it is preferred that the phenol novolac resin contains a compound having a structural unit represented by at least one selected from the group consisting of the following Formulae (II-1) and (II-2).

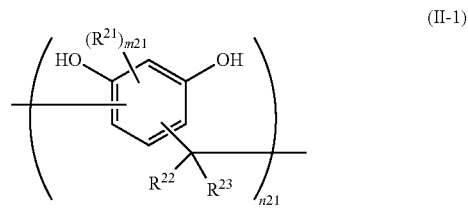

(II-1)

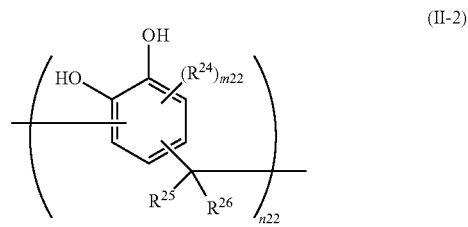

(II-2)

In Formulae (II-1) and (II-2), each of $R^{21}$ and $R^{24}$ independently represents an alkyl group, an aryl group, or an aralkyl group; each of $R^{22}$, $R^{23}$, $R^{25}$ and $R^{26}$ independently represents a hydrogen atom, an alkyl group, an aryl group, or an aralkyl group; each of m21 and m22 independently represents an integer of 0 to 2; and each of n21 and n22 independently represents an integer of 1 to 7.

The alkyl group may be in any of a linear form, a branched form, and a cyclic form.

The aryl group may have a structure containing a hetero atom in an aromatic ring. In this case, the aryl group is preferably a heteroaryl group in which the total number of the hetero atom and carbon atoms is from 6 to 12.

The alkylene group in the aralkyl group may be in any of a linear form, a branched form, and a cyclic form. The aryl group in the aralkyl group may have a structure containing a hetero atom in an aromatic ring. In this case, the aryl group is preferably a heteroaryl group in which the total number of the hetero atom and carbon atoms is from 6 to 12.

In Formulae (II-1) and (II-2), each of $R^{21}$ and $R^{24}$ independently represents an alkyl group, an aromatic group (aryl group), or an aralkyl group. The alkyl group, aromatic group or aralkyl group may also have a substituent if possible. Examples of the substituent include an alkyl group (excluding those cases in which $R^{21}$ or $R^{24}$ is an alkyl group), an aromatic group, a halogen atom, and a hydroxyl group.

Each of m21 and m22 independently represents an integer of 0 to 2 and, when m21 or m22 is 2, the two $R^{21}$s or $R^{24}$s may be the same as or different from each other. Each of m21 and m22 independently is preferably 0 or 1, and more preferably 0.

Furthermore, n21 and n22 are the numbers of structural units represented by Formulae (II-1) and (II-2) that are contained in the phenol novolac resin, respectively, and each independently represent an integer of 1 to 7.

In Formulae (II-1) and (II-2), each of $R^{22}$, $R^{23}$, $R^{25}$ and $R^{26}$ independently represents a hydrogen atom, an alkyl group, an aryl group or an aralkyl group. The alkyl group, aryl group or aralkyl group represented by $R^{22}$, $R^{23}$, $R^{25}$ or $R^{26}$ may further have a substituent, if possible. Examples of the substituent include an alkyl group (excluding those cases in which $R^{22}$, $R^{23}$, $R^{25}$ or $R^{26}$ is an alkyl group), an aryl group, a halogen atom, and a hydroxyl group.

From the viewpoints of storage stability and thermal conductivity, each of $R^{22}$, $R^{23}$, $R^{25}$ and $R^{26}$ in Formulae (II-1) and (II-2) independently is preferably a hydrogen atom, an alkyl group or an aryl group, more preferably a hydrogen atom, an alkyl group having 1 to 4 carbon atoms or an aryl group having 6 to 12 carbon atoms, and still more preferably a hydrogen atom.

From the viewpoint of heat resistance, at least one of $R^{22}$ and $R^{23}$ is preferably an aryl group, and more preferably an aryl group having 6 to 12 carbon atoms. Similarly, at least one of $R^{25}$ and $R^{26}$ is preferably an aryl group, and more preferably an aryl group having 6 to 12 carbon atoms.

The aryl group may have a structure containing a hetero atom in an aromatic ring. In this case, the aryl group is preferably a heteroaryl group in which the total number of the hetero atom and carbon atoms is from 6 to 12.

The phenol-based curing agent may contain a compound having a structural unit represented by Formula (II-1) or (II-2) singly, or a combination of two or more kinds thereof. Preferably, the phenol-based curing agent contains at least one compound having a resorcinol-derived structural unit represented by Formula (II-1).

The compound having a structural unit represented by Formula (II-1) may further contain at least one partial structure derived from a phenol compound other than resorcinol. In Formula (II-1), examples of the partial structure derived from a phenol compound other than resorcinol include partial structures derived from phenol, cresol, catechol, hydroquinone, 1,2,3-trihydroxybenzene, 1,2,4-trihydroxybenzene, and 1,3,5-trihydroxybenzene. These partial structures may be contained singly, or in combination of two or more kinds thereof.

The compound having a structural unit represented by Formula (II-2) may also contain at least one partial structure derived from a phenol compound other than catechol. In Formula (II-2), examples of the partial structure derived from a phenol compound other than catechol include partial structures derived from phenol, cresol, resorcinol, hydroquinone, 1,2,3-trihydroxybenzene, 1,2,4-trihydroxybenzene, and 1,3,5-trihydroxybenzene. These partial structures may be contained singly, or in combination of two or more kinds thereof.

The term "partial structure derived from a phenol compound" used herein means a monovalent or divalent group formed by removing one or two hydrogen atoms from a benzene ring moiety of a phenol compound. The position(s) from which a hydrogen atom(s) is/are removed is/are not particularly restricted.

In the compound having a structural unit represented by Formula (II-1), the content ratio of the resorcinol-derived partial structure is not particularly restricted. The content ratio of the resorcinol-derived partial structure with respect to the total mass of the compound having a structural unit represented by Formula (II-1) is preferably 55% by mass or higher from the viewpoint of elastic modulus, more preferably 80% by mass or higher from the viewpoints of glass transition temperature (Tg) and linear expansion coefficient, and still more preferably 90% by mass or higher from the viewpoint of thermal conductivity.

It is more preferred that the phenol novolac resin contains a novolac resin having a partial structure represented by at least one selected from the group consisting of the following Formulae (III-1) to (III-4).

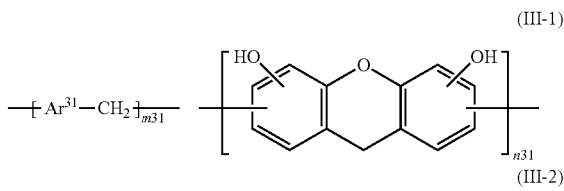

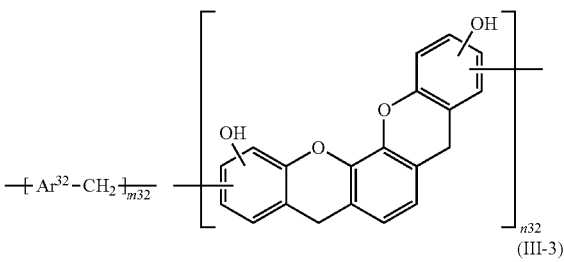

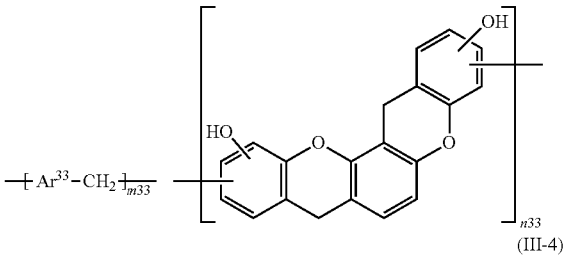

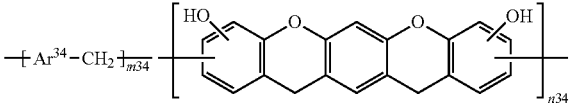

In Formulae (III-1) to (III-4), each of m31 to m34 and n31 to n34 independently represents a positive integer, which indicates the number of the respective structural units to be contained; and each of $Ar^{31}$ to $Ar^{34}$ independently represents a group represented by the following Formula (III-a) or a group represented by the following Formula (III-b).

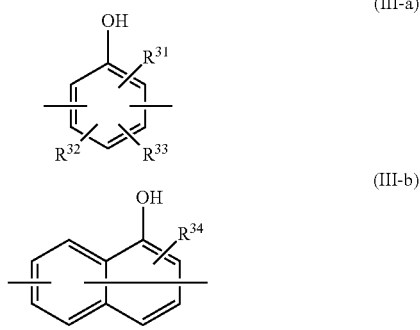

(III-a)

(III-b)

In Formulae (III-a) and (III-b), each of $R^{31}$ and $R^{34}$ independently represents a hydrogen atom or a hydroxyl group; and each of $R^{32}$ and $R^{33}$ independently represents a hydrogen atom or an alkyl group having 1 to 8 carbon atoms.

A curing agent having a partial structure represented by at least one of Formulae (III-1) to (III-4) can be generated as a by-product by the production method of converting a divalent phenol compound into novolac as described below.

The partial structures represented by Formulae (III-1) to (III-4) may each be contained as a main chain skeleton of the compound, or as a part of a side chain of the compound. Furthermore, the respective structural units constituting the partial structure represented by any one of Formulae (III-1) to (III-4) may be contained randomly or regularly, or in a block form. In Formulae (III-1) to (III-4), the positions of hydroxyl group substitutions are not particularly restricted as long as they are on aromatic rings.

In each of Formulae (III-1) to (III-4), the plural $Ar^{31}$ to $Ar^{34}$ may all be the same atomic group, or include two or more atomic groups. Each of $Ar^{31}$ to $Ar^{34}$ independently represents a group represented by any one of Formulae (III-a) and (III-b).

In Formulae (III-a) and (III-b), each of $R^{31}$ and $R^{34}$ independently represents a hydrogen atom or a hydroxyl group and, from the viewpoint of thermal conductivity, $R^{31}$ and $R^{34}$ are preferably hydroxyl groups. The positions of substitutions with $R^{31}$ and $R^{34}$ are not particularly restricted.

In Formulae (III-a) and (III-b), each of $R^{32}$ and $R^{33}$ independently represents a hydrogen atom or an alkyl group having 1 to 8 carbon atoms. Examples of the alkyl group having 1 to 8 carbon atoms that is represented by $R^{32}$ or $R^{33}$ include a methyl group, an ethyl group, an n-propyl group, an isopropyl group, an n-butyl group, an isobutyl group, a t-butyl group, an n-pentyl group, an n-hexyl group, an n-heptyl group, and an n-octyl group. In Formulae (III-a) and (III-b), the positions of substitutions with $R^{32}$ and $R^{33}$ are not particularly restricted.

From the viewpoint of achieving a superior thermal conductivity, $Ar^{31}$ to $Ar^{34}$ in Formulae (III-a) and (III-b) are each preferably at least one selected from the group consisting of a group derived from dihydroxybenzene (a group represented by Formula (III-a) in which $R^{31}$ is a hydroxyl group, and $R^{32}$ and $R^{33}$ are hydrogen atoms) and a group derived from dihydroxynaphthalene (a group represented by Formula (III-b) in which $R^{34}$ is a hydroxyl group).

The term "group derived from dihydroxybenzene" used herein means a divalent group formed by removing two hydrogen atoms from the aromatic ring moiety of dihydroxybenzene, and the positions from which two hydrogen atoms are removed are not particularly restricted. The term "group derived from dihydroxynaphthalene" also has a comparable meaning.

From the viewpoints of productivity and fluidity of the epoxy resin composition, each of $Ar^{31}$ to $Ar^{34}$ independently is more preferably a group derived from dihydroxybenzene, still more preferably at least one selected from the group consisting of a group derived from 1,2-dihydroxybenzene (catechol) and a group derived from 1,3-dihydroxybenzene (resorcinol). In particular, from the viewpoint of particularly improving the thermal conductivity, it is preferred that $Ar^{31}$ to $Ar^{34}$ contain at least a group derived from resorcinol. Further, from the viewpoint of particularly improving the thermal conductivity, it is preferred that the structural units represented by n31 to n34 contain a group derived from resorcinol.

When the compound having a partial structure represented by at least one selected from the group consisting of Formulae (III-1) to (III-4) contains a structural unit derived from resorcinol, the content ratio of a structural unit containing a group derived from resorcinol in the total mass of the compound having a structure represented by at least one of Formulae (III-1) to (III-4) is preferably 55% by mass or higher from the viewpoint of elastic modulus, more preferably 80% by mass or higher from the viewpoints of Tg and linear expansion coefficient, and still more preferably 90% by mass or higher from the viewpoint of thermal conductivity.

In Formulae (III-1) to (III-4), from the viewpoint of fluidity, the ratio of mx and nx (in which, x represents the same value of any of one 31, 32, 33 and 34), mx/nx, is preferably from 20/1 to 1/5, more preferably from 20/1 to 5/1, and still more preferably from 20/1 to 10/1. From the viewpoint of fluidity, the total value of mx and nx is preferably 20 or less, more preferably 15 or less, still more preferably 10 or less. It is noted here that the lower limit of the total value of m and n is not particularly restricted.

The mx and nx each represent the number of the respective structural units and indicate the degree of addition of the corresponding structural unit in the molecule. Therefore, for a single molecule, the mx and nx each represent an integer value. In the case of an aggregate of plural molecules, the mx and nx in (mx/nx) and (mx+nx) each represent a rational number as an average value.

Particularly, when $Ar^{31}$ to $Ar^{34}$ are each at least one of substituted or unsubstituted dihydroxybenzene and substituted or unsubstituted dihydroxynaphthalene, the phenol novolac resin having a partial structure represented by at least one selected from the group consisting of Formulae (III-1) to (III-4) tends to be easily synthesized and provide a curing agent having a low melting temperature, as compared to phenol resins and the like that are obtained by simple conversion into novolac. Therefore, incorporation of such a phenol resin as the curing agent has an advantage of making it easier to produce and handle the epoxy resin composition.

Whether or not the phenol novolac resin has a partial structure represented by any one of Formulae (III-1) to (III-4) can be judged by field-desorption ionization mass spectrometry (FD-MS) based on whether or not the phenol novolac resin contains, as its fragment component, a component corresponding to the partial structure represented by any one of Formulae (III-1) to (III-4).

The molecular weight of the phenol novolac resin having a partial structure represented by at least one selected from the group consisting of Formulae (III-1) to (III-4) is not particularly restricted. From the viewpoint of fluidity, the number-average molecular weight (Mn) is preferably 2,000 or less, more preferably 1,500 or less, and still more preferably from 350 to 1,500. The weight-average molecular weight (Mw) is preferably 2,000 or less, more preferably 1,500 or less, and still more preferably from 400 to 1,500. The Mn and Mw are determined by an ordinary method using gel permeation chromatography (GPC).

The hydroxyl equivalent of the phenol novolac resin having a partial structure represented by at least one selected from the group consisting of Formulae (III-1) to (III-4) is not particularly restricted. From the viewpoint of crosslinking density relating to heat resistance, the hydroxyl equivalent is, in terms of average value, preferably from 45 g/eq to 150 g/eq, more preferably from 50 g/eq to 120 g/eq, and still more preferably from 55 g/eq to 120 g/eq. It is noted here that the term "hydroxyl equivalent" used herein refers to a value determined in accordance with JIS K0070:1992.

The phenol novolac resin may also contain a monomer that is a phenol compound constituting a phenol novolac resin. The content ratio of the monomer that is a phenol compound constituting a phenol novolac resin (hereinafter, also referred to as "monomer content ratio") is not particularly restricted. From the viewpoints of thermal conductivity and moldability, the monomer content ratio in the phenol novolac resin is preferably from 5% by mass to 80% by mass, more preferably from 15% by mass to 60% by mass, and still more preferably from 20% by mass to 50% by mass.

When the monomer content ratio is 80% by mass or less, the amount of a monomer not contributing to crosslinking in a curing reaction is decreased, and the amount of a high-molecular-weight component contributing to crosslinking is increased; therefore, a higher-order structure having a higher density is formed, and the thermal conductivity is thus improved. When the monomer content ratio is 5% by mass or higher, the phenol novolac resin tends to be likely to flow during molding, leading to further improvement in the adhesion with an inorganic filler contained as required, and attainment of superior thermal conductivity and heat resistance.

The content of the curing agent in the epoxy resin composition is not particularly restricted. For example, when the curing agent is an amine-based curing agent, the ratio between the number of equivalents of active hydrogen in the amine-based curing agent (the number of amine equivalents) and the number of epoxy equivalents of the epoxy monomer(s) (number of amine equivalents/number of epoxy equivalents) is preferably from 0.5 to 2.0, and more preferably from 0.8 to 1.2. When the curing agent is a phenol-based curing agent, the ratio between the phenolic hydroxyl equivalent of the phenol-based curing agent (number of phenolic hydroxyl equivalents) and the number of epoxy equivalents of the epoxy monomer(s) (number of phenolic hydroxyl equivalents/number of epoxy equivalents) is preferably from 0.5 to 2.0, and more preferably from 0.8 to 1.2.

(Curing Accelerator)

The epoxy resin composition may contain a curing accelerator. By using a combination of a curing agent and a curing accelerator, it is capable of more satisfactorily curing the epoxy resin composition. The type and the content of the curing accelerator are not particularly restricted, and an appropriate curing accelerator may be selected from the viewpoints of reaction speed, reaction temperature and storage property.

Specific examples of the curing accelerator include imidazole compounds, tertiary amine compounds, organic phosphine compounds, and complexes formed from an organic phosphine compound and an organic boron compound. Among these, from the viewpoint of heat resistance, the curing accelerator is preferably at least one selected from the group consisting of organic phosphine compounds and complexes formed from an organic phosphine compound and an organic boron compound.

Specific examples of the organic phosphine compounds include triphenyl phosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkyl phosphine, dialkylaryl phosphine, and alkyldiaryl phosphine.

Specific examples of the complexes formed from an organic phosphine compound and an organic boron compound include tetraphenyl phosphonium tetraphenyl borate, tetraphenyl phosphonium tetra-p-tolyl borate, tetrabutyl phosphonium tetraphenyl borate, tetraphenyl phosphonium n-butyltriphenyl borate, butyltriphenyl phosphonium tetraphenyl borate, and methyltributyl phosphonium tetraphenyl borate.

These curing accelerators may be used singly, or in combination of two or more kinds thereof.

When a combination of two or more curing accelerators is used, the mixing ratio thereof may be decided with no particular restriction in accordance with the properties desired for the resulting semi-cured epoxy resin composition (e.g., the degree of required flexibility).

When the epoxy resin composition contains a curing accelerator, the content ratio of the curing accelerator in the epoxy resin composition is not particularly restricted. From the viewpoint of moldability, the content ratio of the curing accelerator(s) is preferably from 0.5% by mass to 1.5% by mass, more preferably from 0.5% by mass to 1% by mass, still more preferably from 0.6% by mass to 1% by mass, with respect to the total mass of the epoxy monomer(s) and the curing agent(s).

(Inorganic Filler)

The epoxy resin composition may contain an inorganic filler. When the epoxy resin composition contains an inorganic filler, it is capable of attaining a high thermal conductivity.

The inorganic filler may be non-electroconductive or electroconductive. By using a non-electroconductive inorganic filler, a reduction in insulation tends to be suppressed. Meanwhile, by using an electroconductive inorganic filler, the thermal conductivity tends to be further improved.

Specific examples of the non-electroconductive inorganic filler include aluminum oxide (alumina), magnesium oxide, aluminum nitride, boron nitride, silicon nitride, silica (silicon oxide), silicon oxide, aluminum hydroxide, and barium sulfate. Examples of the electroconductive inorganic filler include gold, silver, nickel, and copper. Among these, from the viewpoint of thermal conductivity, the inorganic filler is preferably at least one selected from the group consisting of aluminum oxide (alumina), boron nitride, magnesium oxide, aluminum nitride and silica (silicon oxide), and more preferably at least one selected from the group consisting of boron nitride and aluminum oxide (alumina).

These inorganic fillers may be used singly, or in combination of two or more kinds thereof.

It is preferred to use a mixture of two or more kinds of inorganic fillers having different volume-average particle sizes from each other. This allows inorganic fillers having smaller particle sizes to be packed in voids between inorganic fillers having larger particle sizes, and the inorganic fillers are thereby more densely packed as compared to a case in which inorganic fillers having a single particle size are used; therefore, a higher thermal conductivity can be exerted.

Specifically, in a case of using aluminum oxide as the inorganic filler, the improved close packing tends to be achieved by mixing, in the inorganic filler, aluminum oxide having a volume-average particle size of from 16 μm to 20 μm, aluminum oxide having a volume-average particle size of from 2 μm to 4 μm and aluminum oxide having a volume-average particle size of from 0.3 μm to 0.5 μm at a ratio of from 60% by volume to 75% by volume, from 10% by volume to 20% by volume and from 10% by volume to 20% by volume, respectively.

Further, in a case of using a combination of boron nitride and aluminum oxide as the inorganic filler, the thermal conductivity can be further improved by mixing, in the inorganic filler, boron nitride having a volume-average particle size of from 20 μm to 100 aluminum oxide having a volume-average particle size of from 2 μm to 4 μm and aluminum oxide having a volume-average particle size of from 0.3 μm to 0.5 μm at a ratio of from 60% by volume to 90% by volume, from 5% by volume to 20% by volume and from 5% by volume to 20% by volume, respectively. The volume-average particle size of the inorganic filler is determined using a laser-diffraction particle size distribution analyzer under normal conditions.

The volume-average particle size (D50) of the inorganic filler may be measured by a laser diffraction method. For example, the inorganic filler is extracted from the epoxy resin composition and measured using a laser diffraction-scattering particle size distribution analyzer (e.g., trade name: LS230, available from Beckman Coulter, Inc.). Specifically, an inorganic filler component is extracted from the epoxy resin composition using an organic solvent, nitric acid, aqua regia or the like and then thoroughly dispersed using an ultrasonic disperser or the like, followed by measurement of the cumulative-weight particle size distribution curve of the thus obtained dispersion.

The volume-average particle size (D50) is the particle size at which the cumulative volume reaches 50% from the side of smaller particle size in the cumulative-volume distribution curve obtained by the above-described measurement.

When the epoxy resin composition contains an inorganic filler, the content ratio thereof is not particularly restricted. Particularly, from the viewpoint of thermal conductivity, the content ratio of the inorganic filler is preferably higher than 50% by volume, and more preferably higher than 70% by volume but 90% by volume or less, taking the total volume of the epoxy resin composition as 100% by volume.

When the content ratio of the inorganic filler is higher than 50% by volume, it is capable of attaining a higher thermal conductivity. When the content ratio of the inorganic filler is 90% by volume or less, a reduction in flexibility of the epoxy resin composition as well as a reduction in insulation tend to be suppressed.

(Silane Coupling Agent)

The epoxy resin composition may contain at least one silane coupling agent. The silane coupling agent is believed to play a role in improving the insulation reliability by forming covalent bonds between the surface of the inorganic filler and the resin surrounding the inorganic filler (this function corresponds to that of a binder), improving the thermal conductivity and inhibiting moisture infiltration.

The type of the silane coupling agent is not particularly restricted, and any commercially available silane coupling agent may be used. Taking into consideration the compatibility between the specific epoxy monomer and the curing agent and reduction in heat conduction loss at the interface of the resin layer and the inorganic filler, it is suitable in the present embodiment to use a silane coupling agent having an epoxy group, an amino group, a mercapto group, a ureido group, or a hydroxyl group at a terminal.

Specific examples of the silane coupling agent include 3-glycidoxypropyltrimethoxysilane, 3-glycidoxypropyltriethoxysilane, 3-glycidoxypropylmethyldiethoxysilane, 3-glycidoxypropylmethyldimethoxysilane, 2-(3,4-epoxycyclohexyl)ethyltrimethoxysilane, 3-aminopropyltriethoxysilane, 3-(2-aminoethyl)aminopropyltrimethoxysilane, 3-(2-aminoethyl)aminopropyltriethoxysilane, 3-aminopropyltrimethoxysilane, 3-phenylaminopropyltrimethoxysilane, 3-mercaptopropyltrimethoxysilane, 3-mercaptopropyltriethoxysilane, and 3-ureidopropyltriethoxysilane, as well as silane coupling agent oligomers represented by SC-6000KS2 (trade name, available from Hitachi Chemical Techno Service Co., Ltd.). These silane coupling agents may be used singly, or in combination of two or more kinds thereof.

(Other Components)

The epoxy resin composition may also contain, as required, other component(s) in addition to the above-described components. Examples of other components include solvents, elastomers, dispersants, and anti-settling agents.

A solvent is not particularly restricted as long as it does not inhibit the curing reaction of the epoxy resin composition, and any commonly used organic solvent may be selected as appropriate.

EXAMPLES

Hereinbelow, the invention will be described more specifically by way of examples. However, the invention is not restricted thereto.

The materials used for the preparation of epoxy resin compositions and abbreviations of the materials are shown below.

(Epoxy Monomer A Having Mesogenic Skeleton (Monomer A))

[4-{4-(2,3-epoxypropoxy)phenyl}cyclohexyl=4-(2,3-epoxypropoxy)benzoate, epoxy equivalent: 212 g/eq; produced by the method described in JP-A No. 2011-74366]

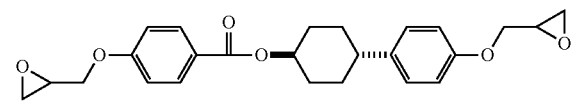

(Epoxy Monomer B having Mesogenic Skeleton (Monomer B))

YL6121H [biphenyl-type epoxy monomer, available from Mitsubishi Chemical Corporation, epoxy equivalent: 172 g/eq]

(Inorganic Filler)

AA-3 [alumina particle, available from Sumitomo Chemical Co., Ltd., D50: 3 μm]

AA-04 [alumina particle, available from Sumitomo Chemical Co., Ltd., D50: 0.40 μm]

HP-40 [boron nitride particle, available from Mizushima Ferroalloy Co., Ltd., D50: 40 μm]

(Curing Agent)

CRN [catechol resorcinol novolac (added ratio based on mass:catechol/resorcinol=5/95) resin, containing 50% by mass of cyclohexanone]

<CRN Synthesis Method>

To a 3-L separable flask equipped with a stirrer, a condenser and a thermometer, 627 g of resorcinol, 33 g of catechol, 316.2 g of a 37%-by-mass aqueous formaldehyde solution, 15 g of oxalic acid and 300 g of water were added, and the flask was heated in an oil bath to 100° C. The added materials were allowed to continuously react for 4 hours under reflux at a temperature of about 104° C. Then, the temperature inside the flask was raised to 170° C. while removing water by distillation. The reaction was allowed to further proceed for 8 hours with the temperature being maintained at 170° C. Thereafter, the resultant was concentrated for 20 minutes under reduced pressure to remove water and the like from the system, thereby obtaining a desired phenol novolac resin CRN.

The structure of the thus obtained CRN was checked by FD-MS (field-desorption ionization mass spectrometry), and the presence of all of partial structures represented by Formulae (III-1) to (III-4) was confirmed.

Under the above-described reaction conditions, it is believed that a compound having a partial structure represented by Formula (III-1) is generated first and this compound undergoes a dehydration reaction to yield compounds having a partial structure represented by at least one of Formulae (III-2) to (III-4).

For the thus obtained CRN, the number-average molecular weight (Mn) and the weight-average molecular weight (Mw) were determined as follows.

The measurement of the Mn and Mw was performed using a high-performance liquid chromatography apparatus (trade name: L6000, available from Hitachi, Ltd.) and a data analyzer (trade name: C-R4A, available from Shimadzu Corporation). As analytical GPC columns, G2000HXL and G3000HXL (trade names) available from Tosoh Corporation were used. The measurement was performed at a sample concentration of 0.2% by mass using tetrahydrofuran as a mobile phase at a flow rate of 1.0 mL/min. A calibration curve was prepared using a polystyrene standard sample, and the Mn and Mw were determined in terms of polystyrene using the calibration curve.

For the thus obtained CRN, the hydroxyl equivalent was also determined as follows.

The hydroxyl equivalent was measured by an acetyl chloride-potassium hydroxide titration method. Since the solution had a dark color, the titration end-point was judged not by a coloration method based on an indicator but by potentiometric titration. Specifically, the hydroxyl equivalent was determined by converting the hydroxyl groups of the resin to be measured into acetyl chloride in a pyridine solution, decomposing excess reagent with water, and then titrating the thus generated acetic acid with a potassium hydroxide/methanol solution.

The CRN obtained above was a mixture of compounds having a partial structure represented by at least one of Formulae (III-1) to (III-4), namely a novolac resin including a curing agent (hydroxyl equivalent: 62 g/eq, number-average molecular weight: 422, weight-average molecular weight: 564) containing 35% by mass of a monomer component (resorcinol) as a low-molecular-weight diluent, in which Ar is a group derived from 1,2-dihydroxybenzene (catechol) or 1,3-dihydroxybenzene (resorcinol) that is represented by Formula (III-a) in which $R^{31}$ is a hydroxyl group, and $R^{32}$ and $R^{33}$ are hydrogen atoms.

(Curing Accelerator)

TPP: triphenyl phosphine [available from Wako Chemical Industries, Ltd., trade name]

(Additive)

KBM-573: 3-phenylaminopropyltrimethoxysilane [silane coupling agent, available from Shin-Etsu Chemical Co., Ltd., trade name]

(Solvent)

CHN: cyclohexanone (Support)

PET film [available from DuPont Teijin Films, Ltd., trade name: A53, thickness: 50 μm]

Copper foil [available from Furukawa Electric Co., Ltd., thickness: 105 μm, GTS grade]

Example 1

(Preparation of Epoxy Resin Composition)

The monomers A and B as epoxy monomers having a mesogenic skeleton were mixed at an epoxy equivalent ratio of 8:2, thereby obtaining an epoxy monomer mixture 1. The compatibility thereof was checked by the method described below, and the epoxy monomer mixture 1 was found to show compatibility at 140° C., which is the curing temperature of the epoxy resin composition.

A varnish-form epoxy resin composition was prepared by mixing 8.19% by mass of the epoxy monomer mixture 1, 4.80% by mass of the CRN as a curing agent and 0.09% by mass of TPP as a curing accelerator, along with 39.95% by mass of HP-40, 9.03% by mass of AA-3 and 9.03% by mass of AA-04 as inorganic fillers, 0.06% by mass of KBM-573 as an additive and 28.85% by mass of CHN as a solvent.

Assuming that the density of boron nitride (HP-40) was 2.20 g/cm³, the density of alumina (AA-3 and AA-04) was 3.98 g/cm³ and the density of a mixture of the epoxy monomers (monomers A and B) and the curing agent (CRN) was 1.20 g/cm³, the proportion of the inorganic fillers with respect to the total volume of all solids of the epoxy resin composition was calculated to be 72% by volume.

(Preparation of Copper Foil-Bearing Cured Epoxy Resin Composition for Evaluation)

The epoxy resin composition was applied to a roughened surface of a copper foil using a dispenser (trade name: SHOTMASTER 300DS-S, available from Musashi Engineering, Inc.) in such a manner that the resulting resin layer after drying would have a size of 45 mm×45 mm and a thickness of 400 Subsequently, the resultant was dried in an oven (trade name: SPHH-201, available from ESPEC Corp.) at a normal temperature (20° C. to 30° C.) for 5 minutes and then at 130° C. for another 5 minutes.

Next, the polyethylene terephthalate (PET) film was placed on the thus dried resin layer, and the resultant was hot-pressed using a vacuum press (press temperature: 150° C., degree of vacuum: 1 kPa, press pressure: 15 MPa, press time: 1 minute), thereby bringing the resin layer into a B-stage state.

Then, the PET film was peeled off from the B-stage resin layer, and a copper foil was arranged on the resin layer with a roughened surface of the copper foil facing the resin layer. In this state, the copper foil and the resin layer were subjected to vacuum-thermocompression bonding using a vacuum press (press temperature: 180° C., degree of vacuum: 1 kPa, press pressure: 15 MPa, press time: 6 minutes). Thereafter, the resultant was heated under atmospheric pressure at 150° C. for 2 hours and then at 210° C. for 4 hours, thereby obtaining a copper foil-bearing cured epoxy resin composition.

(Measurement of Thermal Conductivity)

The copper foil was removed from the thus prepared copper foil-bearing cured epoxy resin composition by etching, thereby obtaining a sheet-form cured epoxy resin composition (resin sheet cured product). The thus obtained resin sheet cured product was cut into a size of 10 mm in length and 10 mm in width, thereby preparing a sample. This sample was blackened by spraying graphite thereto, and the thermal diffusivity was subsequently measured by a xenon flash method (trade name: LFA447 NANOFLASH, available from NETZSCH Japan K.K.). From the product of the thus obtained value, the density measured by Archimedes method and the specific heat measured by DSC (using a differential scanning calorimeter; trade name: DSC PYRIS1, available from PerkinElmer, Co., Ltd.), the thermal conductivity of the resin sheet cured product in the thickness direction was determined. The results are shown in Table 1.

(Confirmation of Formation of Smectic Structure)

The copper foil was removed from the above-prepared copper foil-bearing cured epoxy resin composition by etching, thereby obtaining a sheet-form cured epoxy resin composition (resin sheet cured product). The thus obtained resin sheet cured product was cut into a size of 10 mm in length and 10 mm in width, thereby preparing a sample. This sample was subjected to X-ray diffractometry with $CuK_{\alpha}1$ radiation (using an X-ray diffraction apparatus available from Rigaku Corporation) at a tube voltage of 40 kV and a tube current of 20 mA in a 2θ range of from 2° to 30°, and the formation of a smectic structure was confirmed based on the presence or absence of a diffraction peak in a 2θ range of from 2° to 10°.

(Confirmation of Liquid Crystal Phase)

While heating the epoxy monomer mixture obtained above, the change in the state of the epoxy monomer mixture during the heating was observed in a crossed Nicol state under a polarizing microscope ("BS51", manufactured by Olympus Corporation, magnification: ×100). As a result, a transition from a crystal phase to a liquid crystal state, in which the epoxy monomer mixture changed into a state of exhibiting fluidity while showing interference fringes formed by depolarization, was observed at 120° C. In addition, when the heating was continued further, a transition from the liquid crystal phase to an isotropic phase, in which the phase changed into a dark field, was observed at 170° C. From these results, the epoxy monomer mixture was confirmed to assume a liquid crystal phase at a temperature of from 120° C. to 170° C.

(Measurement of Melting Temperature)

For the epoxy monomer mixture obtained above, the melting temperature was measured using a differential scanning calorimeter ("DSC7", available from PerkinElmer Co., Ltd.). A sample in an amount of from 3 mg to 5 mg, which was hermetically sealed in an aluminum pan, was subjected to differential scanning calorimetry under nitrogen atmosphere in a measurement temperature range of from 25° C. to 350° C. at a heating rate of 10° C./min and a flow rate of 20±5 ml/min, and the temperature at which a change in energy associated with phase transition occurred (temperature of endothermic reaction peak) was defined as the melting temperature (phase transition temperature). The melting temperature was found to be 111° C., which was lower than the melting temperature (125° C.) measured for the monomer A by itself.

(Compatibility)

The epoxy monomer mixture obtained above was heated to the isotropic phase transition temperature or higher and thereby melted. Then, while allowing the thus melted epoxy monomer mixture to naturally cool, the state of the resulting cured product at 140° C., which is the curing temperature of the epoxy resin composition, was observed under a microscope (BS51, available from Olympus Corporation, magnification: ×100). No phase separation was observed in the epoxy monomer mixture. From this result, the epoxy monomer mixture was confirmed to have compatibility at 140° C., which is the curing temperature of the epoxy resin composition.

(Measurement of Viscosity)

For the above-prepared epoxy resin composition, the viscosity A at 25° C. and 5 $min^{-1}$ (rpm) and the viscosity B at 25° C. and 0.5 $min^{-1}$ (rpm) were measured using an E-type viscometer (trade name: TV-33, available from Toki Sangyo Co., Ltd.). From the thus obtained values, the thixotropic index (B/A) was calculated. The results are shown in Table 1.

(Evaluation of Coating Property)

The coating property of the epoxy resin composition was evaluated in accordance with the following criteria. The results are shown in Table 1.

"OK": A case in which no patchiness was observed on the epoxy resin composition-coated surface immediately after coating.

"NG": A case in which patchiness was observed on the epoxy resin composition-coated surface immediately after coating, or the epoxy resin composition clogged the dispenser and thus was not be able to be coated.

(Evaluation of Shape Retainability)

The shape retainability of the epoxy resin composition was evaluated in accordance with the following criteria. The results are shown in Table 1.

"OK": When 1 mL of the epoxy resin composition was dropped onto the glossy surface of a copper foil from 2 cm above the copper foil, the epoxy resin composition spread over an area of less than 30 mm in radius.

"NG": When 1 mL of the epoxy resin composition was dropped onto the glossy surface of a copper foil from 2 cm above the copper foil, the epoxy resin composition spread over an area of larger than 30 mm in radius.

Examples 2 to 8 and Comparative Examples 1 and 2

Epoxy resin compositions of Examples 2 to 8 and Comparative Examples 1 and 2 were prepared in the same manner as in Example 1, except that the amount of the solvent (CHN) was changed.

For the thus obtained epoxy resin compositions, the viscosity, the coating property, the shape retainability and the thermal conductivity were measured or evaluated in the same manner as in Example 1. The results are shown in Table 1.

TABLE 1

|  |  | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|---|
| Viscosity B (Pa·s) | 0.5 min$^{-1}$ | 9 | 8 | 8 | 7 | 8 | 7 | 8 | 7 | 10 | 5 |
| Viscosity A (Pa·s) | 5 min$^{-1}$ | 2.6 | 2.0 | 1.7 | 1.4 | 1.5 | 1.2 | 1.2 | 0.8 | 3.6 | 0.5 |
| Thixotropic index (B/A) |  | 3.5 | 4.0 | 4.7 | 5.0 | 5.3 | 5.8 | 6.7 | 8.8 | 2.8 | 10.2 |
| Coating property |  | OK | OK | OK | OK | OK | OK | OK | OK | NG | OK |
| Shape retainability |  | OK | OK | OK | OK | OK | OK | OK | OK | OK | NG |
| Thermal conductivity (W/(m·K)) |  | 21 | 20 | 22 | 21 | 22 | 22 | 21 | 20 | — | 14 |

As shown in Table 1, the epoxy resin compositions of Examples, which had a thixotropic index at 25° C. of from 3 to 10, were evaluated to have favorable coating property and shape retainability.

The epoxy resin composition of Comparative Example 1, which had a thixotropic index at 25° C. of less than 3, was evaluated to have poor coating property.

Further, the epoxy resin composition of Comparative Example 2, which had a thixotropic index at 25° C. of higher than 10, was evaluated to have poor shape retainability.

From these results, it was found that the resin composition according to the embodiments of the invention has coating property and shape retainability that are suitable for the formation of a resin layer of a laminate.

DESCRIPTION OF SYMBOLS

1: first member
2: resin layer
3, 4: hot plate
5: second member
6, 7: hot plate The disclosure of Japanese Patent Application No. 2016-111372 is hereby incorporated by reference in its entirety. All the documents, patent applications and technical standards that are described in the present specification are hereby incorporated by reference to the same extent as if each individual document, patent application or technical standard is concretely and individually described to be incorporated by reference.

What is claimed is:

1. A resin composition for forming a resin layer of a laminate by coating, the resin composition having a thixotropic index at 25° C. of from 3 to 10 and having a viscosity of from 0.6 Pa·s to 3.5 Pa·s at 25° C. and 5 min$^{-1}$ (rpm), and the laminate comprising a pair of members and the resin layer arranged between the pair of members, the thixotropic index being a ratio (viscosity B/viscosity A) of a viscosity B (Pa·s) measured under conditions of 25° C. and 0.5 min$^{-1}$ (rpm) using an E-type viscometer with respect to a viscosity A (Pa·s) measured under conditions of 25° C. and 5 min$^{-1}$ (rpm) using an E-type viscometer.

2. The resin composition according to claim 1, comprising an epoxy resin.

3. The resin composition according to claim 1, comprising:
an epoxy monomer having a mesogenic skeleton; and
a curing agent.

4. The resin composition according to claim 3, wherein the epoxy monomer having a mesogenic skeleton comprises a compound represented by the following Formula (I):

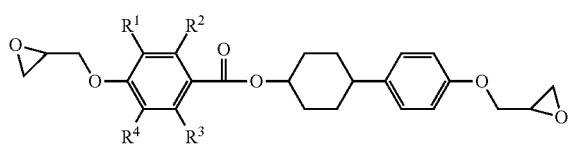

(I)

wherein, in Formula (I), each of R$^1$ to R$^4$ independently represents a hydrogen atom or an alkyl group having from 1 to 3 carbon atoms.

5. The resin composition according to claim 3, wherein the curing agent comprises a phenol novolac resin.

6. A method of producing a laminate, the method comprising:
forming a resin layer using the resin composition according to claim 1 on a first member; and
arranging a second member on the resin layer.

7. The method according to claim 6, wherein the resin composition comprises an epoxy resin.

8. The method according to claim 6, wherein the resin composition comprises:
an epoxy monomer having a mesogenic skeleton; and
a curing agent.

9. The method according to claim 8, wherein the epoxy monomer having a mesogenic skeleton comprises a compound represented by the following Formula (I):

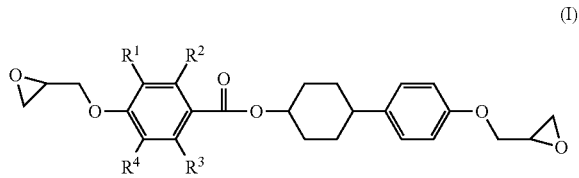

(I)

wherein, in Formula (I), each of R$^1$ to R$^4$ independently represents a hydrogen atom or an alkyl group having from 1 to 3 carbon atoms.

10. The method according to claim 8, wherein the curing agent comprises a phenol novolac resin.

* * * * *